(12) United States Patent
Jones

(10) Patent No.: US 6,197,392 B1
(45) Date of Patent: *Mar. 6, 2001

(54) LOW-ODOR SINGLE ELEMENT EQUIPMENT GRIP

(76) Inventor: Michael G. Jones, 220 Bingham St., San Marcos, CA (US) 92069

( * ) Notice: Subject to any disclaimer, the term of this patent is extended or adjusted under 35 U.S.C. 154(b) by 0 days.

This patent is subject to a terminal disclaimer.

(21) Appl. No.: 09/060,629

(22) Filed: Apr. 15, 1998

Related U.S. Application Data

(63) Continuation-in-part of application No. 08/780,289, filed on Jan. 8, 1997, now Pat. No. 5,801,333.

(51) Int. Cl.$^7$ ............................ A63B 53/14; A63B 49/08; B65B 53/00
(52) U.S. Cl. .................. 428/34.9; 428/35.1; 428/36.8; 428/36.9; 428/913; 473/300; 473/549; 16/DIG. 12; 124/DIG. 8
(58) Field of Search ................... 428/36.8, 36.9, 428/36.91, 36.92, 34.9, 35.1, 492, 910, 913; 76/119; 473/300, 549; 16/DIG. 12, 110.1; 74/551.9; 174/74 A, DIG. 8

(56) References Cited

U.S. PATENT DOCUMENTS

| | | | |
|---|---|---|---|
| 3,972,528 | * 8/1976 | McCracken et al. | 74/551.9 |
| 4,476,742 | * 10/1984 | Midgley | 74/551.9 |
| 4,547,414 | * 10/1985 | Eguchi | 156/86 |
| 5,216,074 | * 6/1993 | Imai et al. | 525/66 |
| 5,288,359 | * 2/1994 | Stobbie, IV et al. | 473/300 |
| 5,292,811 | * 3/1994 | Murata et al. | 525/193 |
| 5,801,333 | * 9/1998 | Jones | 174/74 A |
| 5,909,912 | 6/1999 | Mueller . | |
| 5,977,484 | * 11/1999 | Jones et al. | 174/35 |

OTHER PUBLICATIONS

1996 Rubber Book (48$^{th}$ edn.) [Intertec Publg.: 1996], pp. 228, 290 and 292.
Mark et al. (eds.), Encyclopedia of Polymer Science and Technology, vol. 15, pp. 380–384 (John Wiley & Sons, 1989).
Roff et al., Fibres, Films, Plastics and Rubbers, § 55, pp. 509–514 (Butterworths, 1971).
Harper (ed.) Handbook of Plastics and Elastomers, pp. 4–50 through 4–65 (McGraw-Hill Book Co., 1975).

(List continued on next page.)

*Primary Examiner*—Rena L. Dye
(74) *Attorney, Agent, or Firm*—Brown Martin Haller & McClain LLP

(57) ABSTRACT

A low odor grip is disclosed for a handle of a hand-held implement such as a sports implement or a manual or electric tool which is essentially free of disagreeable odors, which can be installed and quickly shrunk into a tight vapor resistant grip within a matter of a few minutes rather than requiring extended periods of time, and can be installed without the need for any application of heat or use of special tools, equipment or materials. The present device is therefore easy to install, merely sliding over the handle while in dilated state and then allowed to shrink and set by evaporation of the solvent, and thus can be satisfactorily installed in both fabrication facilities and in the field either as an original or replacement grip. The invention also includes an implement fitted with such grip. Representative implements include sports implements such as golf clubs, tennis racquets, weight bars and fishing poles, as well as tools such as hammers, drills, pliers, shovels, axes, and the like. The grip is preferable made of a swellable elastomeric material, preferably a natural or synthetic rubber. Suitable rubbers include EPDM rubber, neoprene or chlorosulfonate polyethylene (Hypalon™) rubber, of which EPDM rubber is preferred.

32 Claims, 1 Drawing Sheet

OTHER PUBLICATIONS

Blackley, Synthetic Rubbers: Their Chemistry and Technology, pp. 136–141, 196–199, (Applied Science Publishers) 1983.

Mark et al. (eds.) Science and Technology of Rubber, pp. 200–207 ($2^{nd}$ ed; Academic Press) 1994.

Morton (ed.) Rubber Technology, pp. 288–291 (3rd ed. Van Nostrand Reinhold Co.) 1987.

Whitby et al. (eds.) Synthetic Rubber, pp. 344–349, 352–353, 492–501, 564–565 (John Wiley & Sons, Inc.) 1954.

* cited by examiner

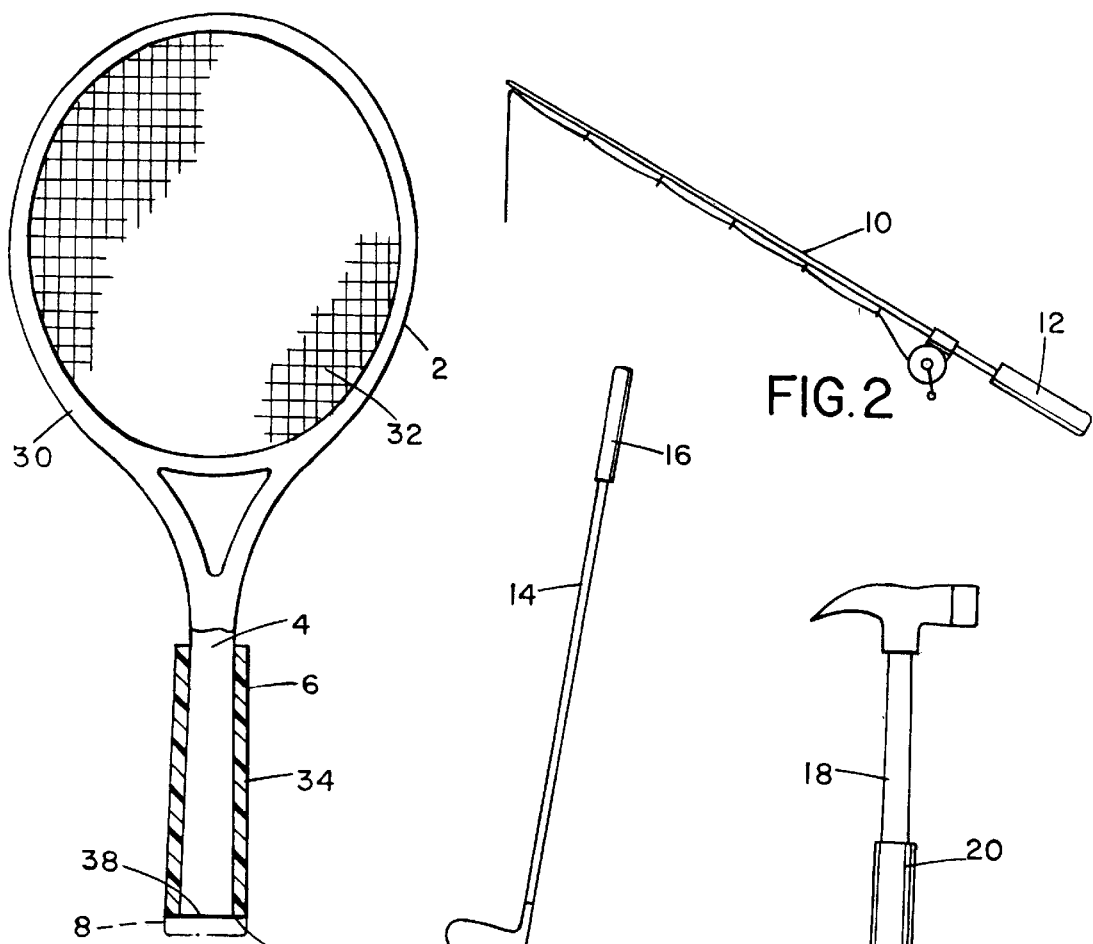

LOW-ODOR SINGLE ELEMENT EQUIPMENT GRIP

CROSS-REFERENCE TO RELATED APPLICATION

This application is a continuation-in-part of application Ser. No. 08/780,289, filed Jan. 8, 1997, now U.S. Pat. No. 5,801,333, and entitled LOW ODOR SINGLE ELEMENT CABLE CONNECTION COVER, and which describes and claims the novel polymeric composition used in the products claimed herein.

BACKGROUND OF THE INVENTION

1. Field of the Invention

The invention herein relates to sports equipment and hand tools, and hand grips therefor. More particularly, it pertains to grips which are formed from a novel polymeric composition.

2. Description of the Prior Art

Many types of sports equipment are designed and intended to be hand-held. These include such implements as tennis rackets, fishing poles, hockey sticks and golf clubs. During the course of play or other usage of such implements, the user's hand almost invariably become sweaty, dirty or oily, any of which can affect the user's ability to grip the implement properly. The result of slippage or other poor grasping of the implement results in poor play or usage of the implement by the user. A tennis player's poor return of an opponent's serve, a golfer's poorly directed wood or iron shot, a fisherman's poor cast, and the like, all illustrate the adverse effect of a user's change in ability to properly grip the implement as play or usage continues.

Similarly, many times sports implements must be used under adverse weather conditions, which can also affect the user's ability to properly grip the implement. Heat causes one's hands to perspire; rain and snow cause the gripping surface of the implement and the user's hands to become wet, prolonged exposure of the implement to strong sunlight, rain or cold can cause the grip material to deteriorate, and so forth.

The same is true for many hand-held tools, both those manually operated (e.g., hammers, pliers, axes, saws, hand drills and shovels) and those electrically driven (e.g., power drills, circular and saber saws and power screw drivers). The inability of the user to grip such tools properly not only can cause work to be poorly done, but may also be dangerous to the user or others in the vicinity if the tool slips during use.

Further, in the case of many types of sports implements (e.g., tennis rackets and golf clubs) and of tools (e.g., hammers, shovels) the user's grip on the tool or implement must remain firm during impact of the tool or implement with a ball or puck or with nails or rocks, respectively, or during pulling on the implement or tool against the user's grip, as when a fish bites on a fishing line or a worker is trying to pull nails with a claw hammer.

Numerous grip materials have been used with varying degrees of success in the past. Most, however, have proved to be limited, especially under adverse weather or usage conditions or over extended periods of time.

Therefore, it would be of significant value if a grip material were available which could be used on a wide variety of hand-held sports implements and tools, which would retain its beneficial gripping properties over time, in poor weather and when gripped by a user whose hands are dirty, sweaty, wet, etc., and which could be easily rapidly secured in place on the sports implement or tool handle.

SUMMARY OF THE INVENTION

The present invention represents a significant improvement over the grips of the prior art, in that the grips of this invention are both single element products and of a "low odor" formulation which imparts essentially no unpleasant odor to the product. The products of this invention are as useful and exceptionally functional as grips for sports implements and tools, but are also "user friendly," in that they can be easily handled and installed as single element products and do not create an environment with an odor disagreeable to the installer or impart a disagreeable odor to their surroundings once installed. This unique grip product therefore incorporates in one device a unique single element structure and a novel combination of solvents which synergistically provide the requisite dilation and evaporation shrinkage properties to the product but which do not generate any unpleasant or disagreeable odor.

The invention therefore is of a "low odor" grip for a handle of a hand-held implement such as a sports implement or a manual or electric tool which is essentially free of disagreeable odors, which can be installed and quickly shrunk into a tight vapor resistant grip within a matter of a few minutes rather than requiring extended periods of time, and can be installed without the need for any application of heat or use of special tools, equipment or materials. The present device is therefore easy to install, merely sliding over the handle while in dilated state and then allowed to shrink and set by evaporation of the solvent, and thus can be satisfactorily installed in both fabrication facilities and in the field either as an original or replacement grip.

The device comprises a sleeve which is chemically swellable and which is initially in a dilated configuration, such that it subsequently shrinks into place merely by evaporation of the volatile swelling solvent and seals against the outer surface of the handle, and thereafter is operable in ambient atmospheric conditions, dust, moisture, etc., and can be properly gripped by a user whose hands are dirty, wet, oily, etc. The critical element in the present invention is the dilating agent, which is used is a mixture of a $C_7$–$C_8$ aliphatic hydrocarbon component and a fluorocarbon component, both components being liquid and volatile at ambient conditions. In preferred embodiments, the hydrocarbon component comprises a plurality of $C_7$–$C_8$ hydrocarbon compounds, preferably a mixture of heptane and octane isomers. The octane isomer:heptane isomer ratio is commonly 1.5–6:1, preferably 2–5:1. The fluorocarbon component normally comprises a chlorofluorocarbon compound, preferably a chlorofluoro-methane, chlorofluoroethane or chlorofluoropropane compound, and more preferably a dichlorofluoroethane compound. The two components are normally in a volumetric ratio of 2–20:1, preferably 5–12:1 hydrocarbon component to fluorocarbon component.

Therefore, in its broadest embodiment, the invention is a grip for a handle of hand-held implement comprising a elongated annular sleeve formed from a material expandable by contact with a dilating chemical composition and shrinkable upon removal of the contact with the chemical composition; the chemical composition comprising a mixture of a $C_7$–$C_8$ aliphatic hydrocarbon component and a fluorocarbon component, both components being liquid and volatile at ambient conditions; the sleeve in chemically expanded state being moveable into disposition around an outer surface of the handle, and covering at least a portion of the outer surface of the handle; whereby when the sleeve is so disposed on the handle and removed from contact with a source of the chemical composition, the chemical composition evaporates from the sleeve and the sleeve thereupon shrinks and at least a portion of the outer surface of the handle to form a tightly fitted and substantially immovable grip secured around the handle, thereby providing a gripping surface for grasping thereof by a use of the implement.

The invention also includes an implement fitted with such grip.

Representative implements include sports implements such as golf clubs, tennis racquets, weight bars and fishing poles, as well as tools such as hammers, drills, pliers, shovels, axes, and the like.

The sleeve is preferably made of a swellable elastomeric material, preferably a natural or synthetic rubber. Suitable rubbers include EPDM rubber, neoprene or chlorosulfonate polyethylene (Hypalon™) rubber, of which EPDM rubber is preferred.

BRIEF DESCRIPTION OF THE DRAWINGS

FIG. 1 is front elevation view of a typical sports racquet having a grip made of a composition described herein.

FIG. 2 is a side elevation view of a typical fishing pole having a grip made of a composition described herein.

FIG. 3 is a side elevation view of a typical golf club having a grip made of a composition described herein.

FIG. 4 is a side elevation view of a typical hammer having a grip made of a composition described herein.

FIG. 5 is a side elevation view of a typical pair of pliers having grips made of a composition described herein.

FIG. 6 is a side elevation view of an electric drill having a grip made of a composition described herein.

FIG. 7 is a front elevation view of a weight bar on which are mounted two or more weights, and which has a pair of grips made of a composition described herein.

DETAILED DESCRIPTION AND PREFERRED EMBODIMENTS

The device of the present invention is best understood by reference to the drawings. Representative hand-held sports implements and tools are illustrated in FIGS. 1–6, to show how the grips made of the compositions described herein are mounted on and used with such products.

In FIG. 1 a sports racquet 2 is illustrated. This may be a racquet used in any type of racquet sport, including but not limited to tennis, badminton, squash, racquetball, or the like. Each such racquet has a frame 30 surrounding a mesh striking member 32 and integrated with a handle 4 by which the player grips the racquet 2. The frame may be of wood, metal or a composite material of fiber-reinforced polymer. The grip 6 is made of a composition described below and mounted on the outer surface of the handle 4 in the manner also to be described below.

Similarly, FIGS. 2 and 3 illustrate, respectively, a fishing rod 10 with the same type of grip 12 mounted on the gripping end of the pole and a golf club 14 with the same type of grip 16 mounted at the grip end of the club shaft. As with the racquet, the material from which the fishing pole or golf club shaft is made may be any conventional material commonly used for such products. It is most common in both types of products to form the pole and shaft from composite fiber-reinforced polymers, such as various polymers reinforced with carbon or glass fibers, but metal and wood are or have been also used. The fishing pole may be for fresh or salt water fishing and for fly fishing, trolling, surf fishing or any other common type of fishing. Likewise, the golf club may be a wood club, an iron club or a putter.

FIGS. 4 and 5 illustrate typical hand-held manually operated tools, namely a claw hammer 18 and a pair of pliers 22, each with a handle grip 20 or 24, respectively, made of the material and in the manner to be described below. Those skilled in the art will of course recognize that these are merely representative of the class, and that many other such tools may also advantageously have grips of this type, including but not limited to hand saws, hand drills, screwdrivers, pry bars, shovels, picks, axes, hatchets, sickles, hoes, rakes, and the like. These will include tools used in building and structure construction, agriculture, mechanical fabrication, assembly line operation, etc. The handles on the various tools are commonly made of metal, but may be fiber-reinforced polymer composites or, less commonly, wood.

Similarly, FIG. 6 illustrates the same type of handle grip mounted on an electrically drive tool, namely a power drill of the common ¼"–½" size. As with the manually operated tools described above, it will be evident to those skilled in the art that many other hand-held power tools can also utilize the unique grips, including circular ("cut off") saws, sabre saws, buffers and sanders, routers, power screwdrivers, and so forth.

The tool handles may be integrated into other portions of the tool's structure, as with a handle formed as part of the drill frame for an electric drill, or may be individual units which are attached to other parts of the tool after formation, as with a hammer handle.

The grips of the present invention, which for brevity herein will be discussed using the grip 6 of the racquet 2 as exemplary, surrounds the handle portion 4 of the sports implement, i.e., racquet 2, and comprises sleeve 34. Sleeve 34 is in elongated tubular form and comprises an elastomeric material which is swellable by absorption of a chemical swelling agent and which shrinks to its initial size upon removal of such agent. Numerous rubbers and other elastomers are known to have this property and a variety of different swelling agents are available in the marketplace. In the present invention, EPDM rubber is the most desirable material. The sleeve 34 will have a wall of a thickness which is thin enough to allow it to conform readily to the various exterior surface shapes of the handle 4 following shrinking but yet of sufficient thickness to insure that the sleeve following shrinkage provides a grip which can readily be held by the user during all portions of play of the sport or use, regardless of the presence of moisture from perspiration, rain or snow, dirt, grease, etc. In addition, it is preferred that the sleeve 34 have sufficient rigidity to prevent it from distorting during use from the grasp of the user's hand, so that the tool or sports implement's underlying handle will not turn or twist during use or play. However, the sleeve 34 must not be so stiff and hard that the user cannot get a firm grasp of it.

A number of elastomers suitable for use as the sleeve in the present invention are widely described in the literature. See, for instance, Morton, RUBBER TECHNOLOGY (2nd edn.: 1973). Most preferred are the terpolymers known as "EPDM" rubbers and made from ethylene/propylene diene copolymer with a methylene component. EPDM rubbers are described in detail in chapter 9 of the Morton reference. Other suitable rubbers include the neoprene (polychloroprene) rubbers and the chlorosulfonated polyethylene rubbers (the latter available under the trademark "HYPALON"); both of these are described in Morton, chapter 13. Commercial sources of the various elastomers are also listed.

In the past, known dilation agents did not have all of the desirable properties of being free of pervasive, offensive odor; capable of dilating the elastomers sufficiently to allow manufacture and use of the grips; safe, readily handled and sufficiently economical for practical use. Standard industry texts, such as the annually published RUBBER RED BOOK (Argus Business Press), have listed the aromatics benzene, toluene and the xylenes as the principal known swelling or dilation agents; many of the other swelling agents found in the literature were mainly known only at the laboratory level. The aromatics themselves of course have drawbacks; they are expensive, have strong and disagreeable odors, are subject to numerous environmental restrictions and often require special handling or disposal.

As described in the copending, aforecited parent application, I have developed a single element product which uses a novel "low odor" dilation composition, which is a combination of non-aromatic compounds. Specifically, the dilation composition that is to be used is a mixture of at least one $C_7$–$C_8$ aliphatic hydrocarbon component and at least one fluorocarbon component, both components being liquid and volatile at ambient conditions, as the dilation composition. Normally the hydrocarbon component is a mixture of two or more $C_7$–$C_8$ aliphatic hydrocarbon compounds, preferably a mixture of heptane and octane isomers. The octane isomer:heptane isomer ratio is commonly 1.5–6:1, preferably 2–5:1. I have had good results with liquid isoparaffinic mixtures commercially available under the tradename "ISOPAR" from Exxon Chemical Co. I prefer, however, to use liquid mixtures commercially available from Phillips Chemical Co. under the tradename "SOLTROL." I have had particular success with the mixture available under the trade designation "SOLTROL 10," which is identified by the vendor as a mixture of, by volume, 28% heptane isomers and 72% octane isomers, of which 62% is 2,2,4-trimethylpentane and 10% is other octane isomers. There is no significant aromatic content.

The fluorocarbon component is normally a chlorofluorocarbon compound, preferably a chlorofluoromethane, chlorofluoroethane or chlorofluoropropane compound, and more preferably a dichlorofluoroethane compound. I have had particularly good results with 1,1-dichloro-1-fluoroethane, available commercially under the trade designation "FLUOROCARBON 141B" from ICI General Chemicals.

The two components are normally present in a volumetric concentration of about 60%–99%, preferably about 80%–95%, of the hydrocarbon component, with the balance being the fluorocarbon component. In a particularly preferred embodiment, I use (by volume) 90% of the SOLTROL 10 hydrocarbon mixture and 10% of the FLUOROCARBON 141B 1,1-dichloro-1-fluoroethane; this combination is preferred for the "volatile dilation composition" used in the practice of the invention.

The combination is a "low odor" composition. By "low odor" I mean that, in contrast to the prior art products and my previous products, the products of this invention do not exhibit any pervasive, harsh, disagreeable or otherwise unpleasant odor. As with any elastomer-based product, there may be a slight rubbery odor, but nothing that is offensive or strong. These products are therefore greatly improved in acceptability to users, since the mild odors which may be present are completely inoffensive.

In the preferred practice of the invention the sleeve 22 is first immersed in the volatile dilation composition, preferably within a liquid- and vapor-tight container into which the appropriate quantity of the solvent combination has previously been measured. (A small excess of free dilation composition may often also be present inside the container, to insure that the sleeves are fully saturated.) Within the container the sleeve 22 becomes dilated and expanded as it becomes saturated with the composition. The container is sealed promptly, which maintains the sleeve 22 in its swollen state, saturated with the dilation composition. The product is provided to the sports implement or tool manufacturing operation sealed in the vapor tight container, to prevent escape of the volatile dilation composition. During fabrication of the sports implement or tool, the fabricator opens the vapor tight container and withdraws the sleeve 34 in its chemically dilated configuration. The sleeve 34 is then slipped over the handle 4 of the tool or implement and positioned at the appropriate location. Normally of course this will be with the end 36 of the sleeve 34 aligned with the distal end 38 of the handle 4, and the rest of the sleeve 34 extending proximally along the handle 4 for the overall length of the sleeve 34. To assist in proper positioning of the sleeve 34, it may be desirable to form the sleeve initially with end 36 closed by cap 8 rather than with both ends being open. The fabricator then will merely slid the dilated sleeve 34 onto the handle 4 until the cap 8 contacts the end 38 of the handle 4, thus automatically positioning the sleeve 34.

For some tools, such as shovels, or sports implements, such as weight bars, such as shown in FIG. 7, the desired position of the grip (or grips, in the case of weight bars) will generally be at an intermediate point along the handle of the product. For instance, the weight bar 40 of FIG. 7 has mounted thereon two or more weights 44 and has a pair of grips 42 mounted on the bar in spaced-apart positions inside the positions of the weights 44, so that the weightlifter can get a good grasp of the weight bar 40 with both hands. To mount these grips 42, the bar manufacturer will take a pair of dilated, open ended sleeves 34 and slide them along bar 40 until the pair reaches their respective positions as grips 42.

Once one or more sleeves 34 are in position as a grip or grips on the tool or sports implement, the fabricator's job is essentially complete as concerns the installation of the grip or grips. He or she only needs to leave the tool or implement with the grip in place exposed to the ambient air for a few minutes, during which time the volatile dilation composition rapidly evaporates from the sleeve 34, causing it to shrink substantially from its enlarged swollen position. The shrinking causes the sleeve 34 to shrink into conformity with the shape of the handle 4 and simultaneously to become sufficiently compressed to form a fixed, stable grip 6, which is best illustrated in FIG. 1.

In similar manner existing sports implements and tools can be retrofitted with grips made of the materials described herein, either as replacements for prior grips which have become worn, damaged, contaminated with perspiration, oil, etc., or have otherwise lost their ability to perform adequately, or as field installation of custom grips for individual users, such as when golf clubs or tennis racquets are custom fitted at pro shops for individual players. For instance, a tennis pro would receive and maintain a supply of dilated sleeves 34 (probably in an assortment of lengths and diameters) each in sealed containers. (Such sleeve may be individually packaged, or a plurality may be placed in a single resealable container, so that when one is extracted for use, the container can be resealed to insure that the remainder in the package maintain their dilation until used.) The pro would then select the appropriate sleeve 34 from a particular player and install it on the player's racquet, golf club, etc., either as an initial installation or after removing the old grip.

The volatilities of the dilation compositions of this invention are sufficiently low such that there will be ample time for the repairer or installer to place the sleeve 34 over the handle 4 and then slide the sleeve 34 into position before substantial shrinkage occurs. However, the volatilities are also sufficiently high that once the device is in place, enough shrinkage takes place within thirty minutes (and preferably less) that the grip is thereafter firmly fixed in place. Further evaporation of any residual dilation composition merely enhances the quality of the seal. The combination compositions of this invention include mixtures of a wide range of volatilities, and a suitable selection for any application can easily be determined by those skilled in the art. For instance, the SOLTROL 10 hydrocarbon mixture has a volatile content of essentially 100%, an evaporation rate of >1 (where butyl acetate=1), and a vapor pressure of 2.2 psia at 100° F. (15.2 kPa at 37.8° C.). Similarly, the FLUOROCARBON 141B 1,1-dichloro-1-fluoroethane also has a volatile content of essentially 100% and a vapor pressure of 10.0 psia at 68° F. (68.9 kPa at 20° C.). It will be recognized that volatility will be affected by such factors as ambient temperature, humidity and initial degree of solvent saturation. Also, where more than one product is included in the initially sealed package (as will be common for small size products), the volatility must be sufficiently low that opening the package several times to withdraw individual products does not cause the products remaining in the package to become dried out and shrink. In the last case, it will be advantageous to have the installer be sure to close the vapor-tight package promptly after withdrawing the desired product, and it may also help to have a small amount of liquid solvent in the package to maintain saturation of the remaining products.

It will be noted that since the device is made of a moisture resistant material to start with, installation of the device (as for tool repair in the field) in inclement weather or under high humidity circumstances is greatly simplified. The installer only needs to place the sleeve 34 over the tool handle and wait a few minutes while the shrinkage occurs and the grip is firmly seated. Even thought the shrinkage of the sleeve 34 has only begun with the initial evaporation of the dilation composition, the moisture impervious nature of the sleeve 34, being made of a hydrophobic elastomeric material, sheds the moisture away from the grip even while it is shrinking into place, thus effectively preventing moisture incursion under the grip even before the shrinkage is substantially completed. This is of considerable advantage for making repairs to damaged tools in inclement weather such as rain or snow, since the installer need only protect the sleeve and handle of the tool for a few moments while the sleeve is mounted and moved into position. The same will be true for other weather elements, such as snow or sleet, although in the case of blowing dust the installer preferably will shield the tool from dust as much as possible, to minimize the amount of dust which might otherwise blow into and become trapped underneath the sleeve/grip. Entrapment of a minute amount of dust is normally of no consequence, as long as it does not make the handle feel uncomfortable to the tool user or sufficiently reduce the adhesion of the grip to the tool handle to allow for slippage of the grip.

It will be seen that this invention is a substantial improvement over the grips of the past, since the grip of the present invention shrinks entirely by evaporation of the swelling agent and does not require any effort on the part of the installer, nor the application of any tools or heat sources. The present grip is easy to install, merely sliding along the tool or implement handle, and thus can be satisfactorily installed even in field locations or when inclement weather such as rain would make use of a heating or sealing device either awkward or impossible. In addition, as compared to many prior grips the grips of the present invention do not have any disagreeable or pervasive odor, and can be considered to be essentially odor-free. It will be recognized that this is an important advantage for use of the products generally, but in particular will be advantageous for the fabricator of the sports implement or tool, or a subsequent field installer such as a club pro, both of whom may have to work repeatedly with dilated sleeves in cramped or poorly ventilated surroundings.

Those skilled in the art will immediately recognize that there are numerous embodiments of the present invention which, while not expressly described above, are clearly within the scope and spirit of the invention. The above disclosure is therefore intended to be exemplary only, and the scope of the invention is to be limited solely by the appended claims.

What is claimed is:

1. A grip for a handle of hand-held implement comprising:
   a elongated annular sleeve formed from an elastomeric material expandable by contact with a dilating chemical composition and shrinkable upon removal of said contact with said chemical composition;
   said chemical composition comprising a mixture of a $C_7$–$C_8$ aliphatic hydrocarbon component and a fluorocarbon component, both components being liquid and volatile at ambient conditions;
   said sleeve in chemically expanded state being moveable into disposition around an outer surface of said handle, and covering at least a portion of said outer surface of said handle;
   whereby when said sleeve is so disposed on said handle and removed from contact with a source of said chemical composition, said chemical composition evaporates from said sleeve and said sleeve thereupon shrinks and at least a portion of said outer surface of said handle to form a tightly fitted and substantially immovable grip secured around said handle, thereby providing a gripping surface for grasping thereof by a user of said implement.

2. A grip as in claim 1 wherein said elastomeric material comprises a natural or synthetic rubber.

3. A grip as in claim 2 wherein said material comprises a synthetic rubber.

4. A grip as in claim 3 wherein said synthetic rubber is EPDM rubber, neoprene or chlorosulfonate polyethylene rubber.

5. A grip as in claim 1 wherein said plurality of $C_7$–$C_8$ aliphatic hydrocarbon compounds comprises a mixture of heptane and octane isomers.

6. A grip as in claim 5 wherein the volumetric ratio of said octane isomers to said heptane isomers is in the range of 1.5–6:1.

7. A grip as in claim 6 wherein the volumetric ratio of said octane isomers to said heptane isomers is in the range of 2–5:1.

8. A grip as in claim 1 wherein said fluorocarbon component comprises a chlorofluorocarbon compound.

9. A grip as in claim 8 wherein said chlorofluorocarbon compound comprises a chlorofluoromethane, chlorofluoroethane or chlorofluoropropane compound.

10. A grip as in claim 9 wherein said chlorofluorocarbon compound comprises a dichlorofluoroethane compound.

11. A grip as in claim 10 wherein said chlorofluorocarbon compound comprises a 1,1-dichloro-1-fluoroethane.

12. A grip as in claim 1 wherein prior to evaporation said hydrocarbon component is present in an amount in the range of about 60%–99% by volume of said chemical composition and said fluorocarbon component is present as the balance of said chemical composition.

13. A grip as in claim 12 wherein said hydrocarbon component is present in an amount in the range of about 80%–95% by volume of said chemical composition and said fluorocarbon component is present as the balance of said chemical composition.

14. A grip as in claim 13 wherein said hydrocarbon component is present in an amount in the range of about 90% by volume of said chemical composition and said fluorocarbon component is present as the balance of said chemical composition.

15. A grip as in claim 1 wherein removable of contact between said sleeve material and said chemical composition comprises evaporation of said chemical composition upon exposure to air.

16. A grip as in claim 1 wherein said sleeve is open at both ends, such that when said sleeve is shrunk into place a distal end of said handle is exposed through one open end of said sleeve.

17. A grip as in claim 1 wherein said sleeve is open at only one end and closed at another end, said open end being that end disposed around said handle and said closed end abutting said distal end of said handle.

18. A grip as in claim 1 wherein said implement comprises a hand-held sports implement or tool.

19. A grip as in claim 18 wherein said sports implement comprises a racquet, pole, bar or shaft.

20. A grip as in claim 19 wherein said racquet comprises a tennis, squash, badminton or racquetball racquet.

21. A grip as in claim 19 wherein said shaft comprises a shaft of a golf club.

22. A grip as in claim 19 wherein said pole comprises a fishing pole.

23. A grip as in claim 18 wherein said tool comprises a hand-held manually operated tool.

24. A grip as in claim 18 wherein said tool comprises a hand-held electrically operated tool.

25. A hand-held implement comprising a handle for grasping by a user during use of said implement, said handle having an outer surface and disposed thereon a grip for grasping by a user of said implement, said grip comprising a grip as in claim 1.

26. An implement as in claim 25, said implement comprising a hand-held sports implement or tool.

27. An implement as in claim 26 wherein said sports implement comprises a racquet, pole, bar or shaft.

28. An implement as in claim 27 wherein said racquet comprises a tennis, squash, badminton or racquetball racquet.

29. An implement as in claim 27 wherein said shaft comprises a shaft of a golf club.

30. Am implement as in claim 27 wherein said pole comprises a fishing pole.

31. An implement as in claim 27 wherein said tool comprises a hand-held manually operated tool.

32. An implement as in claim 27 wherein said tool comprises a hand-held electrically operated tool.

* * * * *

UNITED STATES PATENT AND TRADEMARK OFFICE
CERTIFICATE OF CORRECTION

PATENT NO.   : 6,197,392 B1                                                      Page 1 of 1
DATED        : March 6, 2001
INVENTOR(S)  : Jones, Michael G.

It is certified that error appears in the above-identified patent and that said Letters Patent is hereby corrected as shown below:

<u>Column 9,</u>
Line 16, "removable" to -- removal --.

Signed and Sealed this

Ninth Day of July, 2002

Attest:

JAMES E. ROGAN
Attesting Officer         *Director of the United States Patent and Trademark Office*